United States Patent
Kumar et al.

(10) Patent No.: US 10,124,297 B1
(45) Date of Patent: Nov. 13, 2018

(54) THIN FILM NANOCOMPOSITE NANOFILTRATION MEMBRANE

(71) Applicant: KUWAIT INSTITUTE FOR SCIENTIFIC RESEARCH, Safat (KW)

(72) Inventors: Rajesha Kumar, Safat (KW); Mansour Ahmed, Safat (KW); Bhadrachari Garudachari, Safat (KW); Jibu P. Thomas, Safat (KW)

(73) Assignee: KUWAIT INSTITUTE FOR SCIENTIFIC RESEARCH, Safat (KW)

(*) Notice: Subject to any disclaimer, the term of this patent is extended or adjusted under 35 U.S.C. 154(b) by 0 days.

(21) Appl. No.: 15/913,706

(22) Filed: Mar. 6, 2018

(51) Int. Cl.
*B01D 71/48* (2006.01)
*B01D 69/12* (2006.01)
*B01D 61/02* (2006.01)
*B01D 67/00* (2006.01)
*B01D 71/02* (2006.01)
(Continued)

(52) U.S. Cl.
CPC ........... *B01D 69/12* (2013.01); *B01D 61/027* (2013.01); *B01D 67/0006* (2013.01); *B01D 69/148* (2013.01); *B01D 71/021* (2013.01); *B01D 71/022* (2013.01); *B01D 71/024* (2013.01); *B01D 71/48* (2013.01); *C02F 1/442* (2013.01); *C02F 2101/108* (2013.01); *C02F 2103/08* (2013.01)

(58) Field of Classification Search
None
See application file for complete search history.

(56) References Cited

U.S. PATENT DOCUMENTS 4,259,183 A * 3/1981 Cadotte ............... B01D 69/125
210/500.28
2008/0000843 A1 1/2008 Sasaki et al.
(Continued)

FOREIGN PATENT DOCUMENTS

CN 102512993 A 6/2012
JP 2016155067 A 1/2016
WO 2016136304 A1 9/2016

OTHER PUBLICATIONS

Yalcinkaya et al., "Thin Film Nanofibrous Composite Membrane for Dead-End Seawater Desalination," Journal of Nanomaterials, vol. 2016.

(Continued)

*Primary Examiner* — Krishnan S Menon
(74) *Attorney, Agent, or Firm* — Richard C. Litman

(57) ABSTRACT

A thin film nanocomposite nanofiltration membrane or TFC-NF membrane includes an ultrafiltration support membrane coated with a trimesic acid coating layer. The trimesic acid coating layer is formed or self-assembled on the ultrafiltration support membrane by pouring an aqueous solution of a water soluble tertiary amine on the support membrane to form a first coating layer and then applying a solution of trimesolychloride on the first coating layer. In other words, the trimesic acid coating layer can be formed as a result of the liquid-liquid interface of the water soluble tertiary amine and the trimesolychloride. A total thickness of the TFC-NF membrane can be about 150 μm. The thin film nanocomposite nanofiltration membrane can be free from MPD monomers.

13 Claims, 12 Drawing Sheets

(51) Int. Cl.
  *C02F 1/44*   (2006.01)
  *B01D 69/14*  (2006.01)
  *C02F 103/08*  (2006.01)
  *C02F 101/10*  (2006.01)

(56) References Cited

U.S. PATENT DOCUMENTS

| | | | |
|---|---|---|---|
| 2008/0149561 A1* | 6/2008 | Chu | A61L 15/425 |
| | | | 210/500.38 |
| 2011/0005997 A1* | 1/2011 | Kurth | B01D 65/08 |
| | | | 210/500.27 |
| 2011/0027599 A1 | 2/2011 | Hoek et al. | |

OTHER PUBLICATIONS

Kim et al., "Novel thin-film composite membrane for seawater desalination with sulfonated poly (arylene ether sulfone) containing amino groups,"Journal Desalination and Water Treatment, vol. 43, 2012, Issue 1-3 (Abstract).

Chatterjee et al., "Self-assembled four-membered networks of trimesic acid forming organic channel structures," Journal of Molecular Structure, 520, 2000, pp. 107-115.

Dale et al., "Stepwise dis-assembly of trimesic acid: mono- and bis(methanol) solvates," Chem. Comm, 2004, pp. 1278-1279.

Paz et al., "Supramolecular architecture of a novel salt of trimesic acid and 1,2-bis(4-pyridyl)ethane," CrystEngComm, 5(41), 2003, pp. 238-244.

* cited by examiner

THIN FILM NANOCOMPOSITE NANOFILTRATION MEMBRANE

BACKGROUND

1. Field

The present disclosure relates to thin film nanocomposite nanofiltration membranes, and particularly to a thin film nanocomposite nanofiltration membrane including a trimesic acid coating layer.

2. Description of the Related Art

Generally, boron in seawater presents a significant challenge for water treatment systems employing a single-phase nanofiltration (NF)-reverse osmosis (RO) hybrid system for the production of potable water. Boron in seawater varies in the range of 3.5 to 5.0 ppm. According to world health organization (WHO) a boron level above >0.5 ppm is not recommended for human health.

Many conventional NF membranes are not suitable for boron rejection at seawater pH (7.5-8.5), since at seawater pH, boron exists as neutral boric acid $B(OH)_3$ form. Hence, for conventional NF membranes to effectively provide seawater boron rejection, a pH adjustment of 9.5 or 10 is generally necessary to convert $B(OH)_3$ to charged $B(OH)_4$. When the pH is increased to such levels, however, a precipitation of alkaline scaling species such as $Ca^{2+}$, $Mg^{2+}$, accumulates in the seawater. Scaling due to divalent ions is a major challenge faced by RO (reverse osmosis) and MSF (multi stage flash) seawater desalination technologies. Also, pH adjustment by the addition of base is not recommended in seawater desalination since it contributes to additional salinity.

Another problem with many conventional NF membranes relates to degradation. For example, membranes that include polyamide (PA) can be degraded by chlorine, which is commonly added in the form of sodium hypochlorite as a disinfectant to control biofouling or as a membrane cleaning agent. The membrane degradation, mainly caused by N-chlorination of polyamides, leads to hydrophobic membrane surfaces.

Other conventional membranes are fabricated by interfacial polymerization between meta-Phenylene diamine (MPD) and trimesoyl chloride. Membranes that include phenylene diamine (MPD) are prone to degradation because MPD is unstable in nature, and sensitive to light and moisture. As a consequence, these factors lead to flux reduction and selectivity loss.

Hence, boron rejection and NF membrane stability have been a major challenge for conventional membrane based seawater pretreatment technology. Thus, a thin film nanocomposite nanofiltration membrane solving the aforementioned problems is desired.

SUMMARY

A thin film nanocomposite nanofiltration membrane or TFC-NF membrane includes an ultrafiltration support membrane coated with a trimesic acid coating layer. The trimesic acid coating layer can be formed or self-assembled on the ultrafiltration support membrane by providing an aqueous solution of a water soluble tertiary amine, e.g., trimethylamine, on the support membrane to form a first coating layer and then applying a solution of trimesolychloride on the first coating layer to form a second layer. The second layer can include the trimesic acid coating layer. In other words, the trimesic acid coating layer can be formed as a result of the liquid-liquid interface of the water soluble tertiary amine and the trimesolychloride. A total thickness of the TFC-NF membrane can be about 150 μm. The thin film nanocomposite nanofiltration membrane can be free from MPD monomers.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
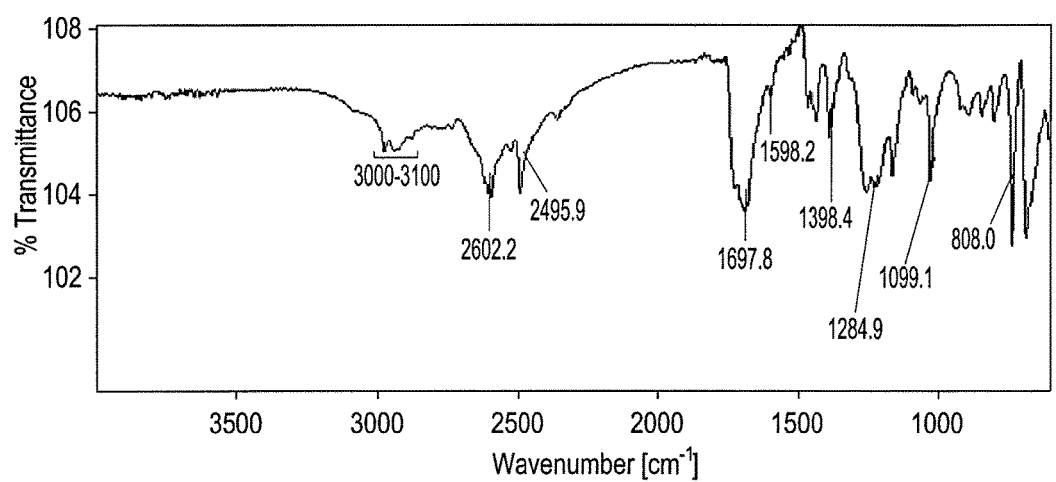
FIG. 1 shows Fourier-transform infrared spectroscopy (FTIR) analysis of the trimesic acid layer formed at the triethylamine and trimesoyl chloride interface.

A thin film nanocomposite nanofiltration membrane or TFC-NF membrane includes an ultrafiltration support membrane and a trimesic acid coating layer on the support membrane. The trimesic acid coating layer is self-assembled on the ultrafiltration support once a water soluble tertiary amine, e.g., triethylamine (TEA, liquid), and trimesolychloride (TMC, liquid) are interfaced (FIG. 1). In other words, the trimesic acid coating layer can be formed as a result of the liquid-liquid interface of the water soluble tertiary amine and TMC. A total thickness of the TFC-NF membrane can be about 150 μm. The trimesic acid layer is stabilized by hydrogen bonding. The ultrafiltration support can include a polyethersulfone ultrafiltration support. The thin film nanocomposite nanofiltration membrane can be stable over a wide range of pH, e.g., pH 3 to about pH 12, and a wide range of pressure, e.g., about 5 bar to about 40 bar. The thin film nanocomposite nanofiltration membrane can be free from MPD monomers.

The thin film nanocomposite nanofiltration membrane is suitable for various applications, including, water filtration and/or softening (seawater and brackish water pretreatment), wastewater treatment (industrial, medical, produced water, saline ground water etc.), vegetable oil processing, beverage industry, dairy industry and sugar industry. The thin film nanocomposite nanofiltration membrane can provide seawater boron rejection while rejecting sealant ions to prevent scaling and avoiding degradation.

A variety of nanomaterials at different compositions (in the range of about 0.025 wt % to about 2.0 wt %) can be dispersed in the water soluble tertiary amine, e.g., aqueous triethylamine solution (TEA), to further increase the boron rejection rate (e.g., about 50%), and improve the maximum permeability value, e.g., (about 0.16 $Lm^{-2}h^{-1}bar^{-1}$) of the thin film nanocomposite nanofiltration membrane. The nanomaterials can have a size ranging from about 10 nm to about 70 nm. The nanomaterials can include hydroxyl groups, metal oxides, carboxylic acid, sulphonic acid and/or amine functional group. The nanomaterials can include graphene oxide and/or titanium dioxide. In an embodiment, the thin film nanocomposite nanofiltration membrane can include 0.05 wt % composition titanium oxide (hereinafter referred to as the "TFN-0.05 $TiO_2$ membrane"). Incorporation of the nanomaterials can achieve nearly three times higher rejection for toxic boron present in the seawater compared to commercial membranes.

The highest boron rejection levels reported for conventional membranes generally range from about 15% to about 20%, at a seawater pH ranging from about pH 7.5 to about pH 8.2. The TFC-NF and TFN-0.05 $TiO_2$ membranes can achieve a boron rejection of greater than 40% or greater than 50%, such as about 50% during, seawater pretreatment at seawater pH ranging from about pH 7.5 to about pH 8.5, e.g., pH 8.1. Similarly, the data for ionic rejection of seawater constituent ions obtained for both TFC-NF and TFN-0.05 $TiO_2$ membranes were higher than that associated with commercial NF membranes reported so far.

In nanofiltration technology, size exclusion is an important principle governing salt rejection. Generally, divalent ions will be rejected to a larger extent compared to monovalent ions. Unlike conventional NF membranes, however, the present membranes showed high levels of rejection for both divalent and monovalent ions. The top layer of the present membranes possess a streaming potential of ~(-46 mV) at pH 8.0-8.5, which is a higher negative charge than any commercial NF membrane. It is believed that the highly negative charged surfaces causes the Donnan exclusion principle to dominate over the size exclusion principle.

According to an embodiment, the thin film composite NF (TFC-NF) membrane can be fabricated by submerging a porous ultrafiltration support membrane in deionized water. The water can have a temperature of about 50° C. The ultrafiltration support membrane can be submerged in the water for about 30 minutes. The ultrafiltration support membrane can then be taken out of the water and any water droplets on the membrane surface can be wiped off. An aqueous solution of a water soluble tertiary amine can then be poured onto the membrate surface. For example, 1.0 wt % trimethylamine (about 50 mL), can be poured onto the membrane surface and allowed to diffuse into the support for a period of time (e.g., about 2 minutes) at a suitable temperature (about 25° C.). The excess amine solution on the membrane can then be removed. A solution of freshly prepared trimesoyl chloride (TMC) in n-hexane (0.1 wt %) can then be poured on the membrane surface that includes the water soluble tertiary amine, e.g., TEA, and allowed to stand for a period of time (e.g., about 2 minutes) at a suitable temperature (e.g., about 25° C.). The excess TMC can be removed prior to disposing the membrane inside a hot air oven at a temperature of about 90° C. for about 10 min to complete the hydrolysis reaction of TMC to trimesic acid. Synthesis of the trimesic acid nanofiltration layer on the ultrafiltration support involves self-assembly of trimesic acid molecules stabilized by hydrogen bonding. The water soluble tertiary amine, e.g., triethyl amine, acts as a base for hydrolysis of trimesoyl chloride and serves to attach trimesic acid to the membrane surface via ionic interactions.

The thickness of the active layer or coating layer formed can be varied in the range of about 100 nm to about 550 nm, e.g., about 110 nm to about 530 nm, by varying the concentration levels of water soluble tertiary amine, e.g., about 0.25 wt % to about 1.5 wt %, while maintaining the constant concentration of about 0.1 wt % of TMC, as shown in Table 1.

TABLE 1

The variation of top layer thickness of the NF membranes formed with TEA and TMC compositions.

| TEA (wt %) | TMC (wt %) | Top layer thickness (nm) |
|---|---|---|
| 0.25 | 0.1 | 110-150 |
| 0.50 | 0.1 | 180-240 |
| 0.75 | 0.1 | 300-350 |
| 1.00 | 0.1 | 350-400 |
| 1.25 | 0.1 | 420-470 |
| 1.50 | 0.1 | 480-530 |

Triethylamine plays a dual role of hydrolysis of the trimesoyl chloride to self-assembled trimesic acid molecules, and further, penetration of trimesic acid molecules to the membrane surface through ionic interactions. NMR spectral studies confirmed such interactions on the UF support by displaying the peaks corresponding to both trimesic acid and triethylamine.

Figure 3:
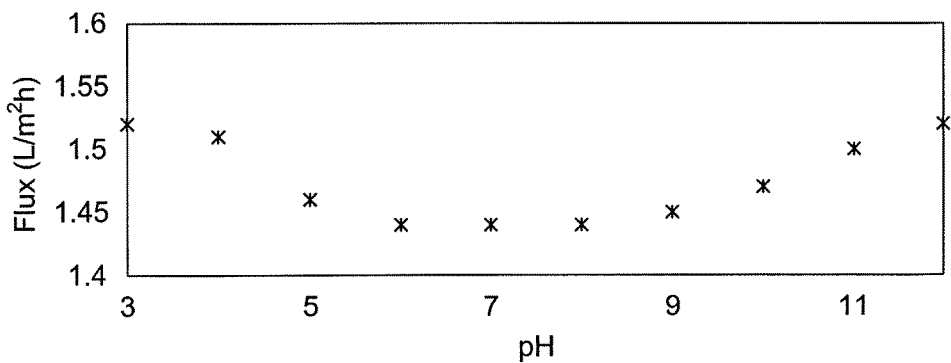
FIG. 3 is a graph showing the pH dependent flux values of the TFC NF membrane.

The TFN-0.05 $TiO_2$ membrane can be prepared in a manner similar to that described above, except that the nanomaterials, e.g., titanium dioxide, graphene oxide, can be incorporated onto a top surface of the NF membranes (FIG. 3). For example, different concentrations of the nanomaterials (in the range of about 0.025 wt % to about 2.0 wt %) can be dispersed in the aqueous water soluble tertiary amine solution. The solution can be exposed to ultra-sonication for about 15 minutes at an amplitude of about 30% and a pulse of about 25 for the uniform distribution of nanomaterials in TEA solution. Subsequently, the trimesic acid layer can be formed as described above.

TFC-NF membranes fabricated with 1.0 wt % of TEA in water and 0.1 wt % of TMC in hexane showed high selectivity towards boron rejection (~40%) with permeability of 0.14 $Lm^{-2}h^{-1}bar^{-1}$ tested for the seawater sample collected from Doha East seawater desalination plant, Kuwait. The incorporation of a variety of nanomaterials at different compositions (in the range of about 0.025 wt % to about 2.0 wt %) by dispersing in the aqueous triethylamine solution further increased the boron rejection rate up to 50% with improved new maximum permeability value of 0.16 $Lm^{-2}h^{-1}$ $bar^{-1}$. The rejection data for other seawater constituents by the TFC-NF membrane are higher than the commercial NF90 membrane, which is considered a high performer in seawater pretreatment applications. Remarkably, for a certain composition of nanomaterial incorporation, the TFN membranes produced nearly three times higher rejection for toxic boron present in the seawater compared to commercial NF90.

The self-assembled trimesic acid layer in the presence of nanomaterial is represented by the structural formula below.

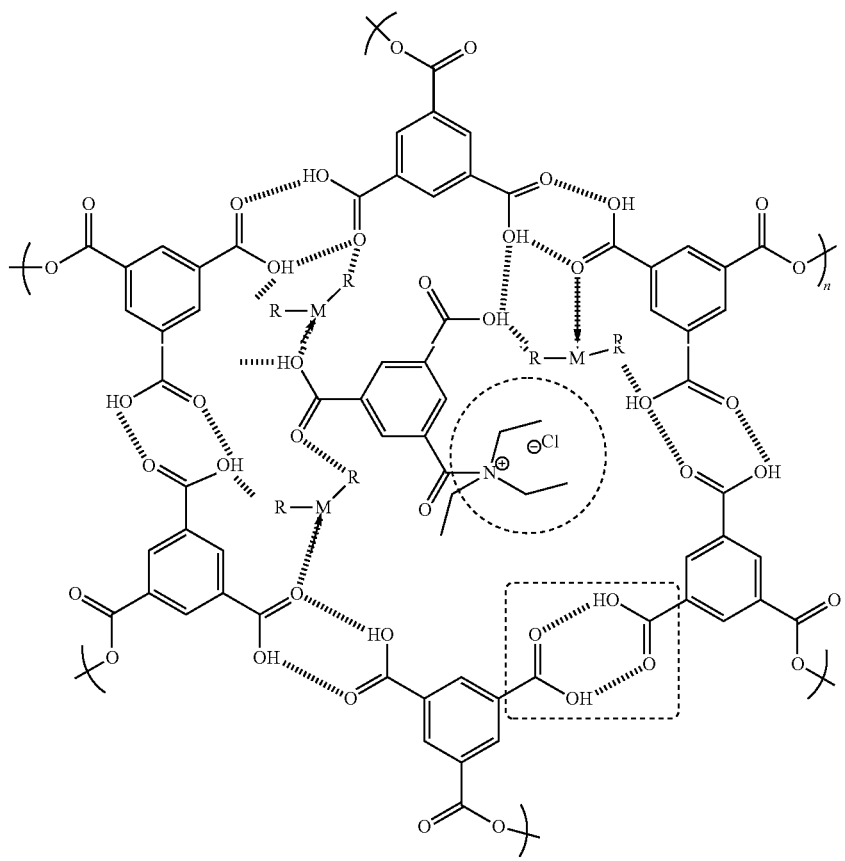

wherein,

M is a metal atom of the nanomaterial; and

R is selected from the group consisting of hydroxyl, sulfonic acid, carboxylic acid, and amine.

It should be understood that the trimesic acid nanofiltration layer could be formed over various ultrafiltration supports in their flat sheet and hollow fiber forms. Trimesic acid is non-toxic and relatively harmless in nature (LD 50 oral: LD50 Rat 16000 mg/kg) based on the toxicological information provided by Merck Co (Merck catalogue, CAS No. 801299). The support layer of the NF membrane could be fabricated using a wide range of polymers, e.g., polysulfone, polyethersulfone, polyetheretherketone, polyvinylidine fluoride, polypropylene, polytetrafluoroethylene, polyphenylsulfone, polyetherimide, and polyacrylonitrile, satisfying a molecular weight cut off ranging from about 4500 to about 5000 Da.

The present teachings are illustrated by the following Examples.

Example 1

General Protocol for TFC and TFN-TiO$_2$ Membrane Synthesis

A thin film composite NF (TFC-NF) membrane was fabricated by dipping the UF support membrane in deionized water at 50° C. for 30 min prior to coating. The UF membrane was clamped on a glass plate (~A4 size) and traces of water droplets were removed from the membrane surface using compressed air passed through an airgun. An aqueous solution of 1.0 wt % triethylamine (50 mL) was poured onto the membrane surface and allowed to diffuse into the porous support for 2 min at 25° C. The excess amine solution was drained off from the membrane surface by holding the glass plate vertically. Again, a compressed air was applied to remove the traces of amine droplets from the membrane surface. A solution of freshly prepared trimesoyl chloride (TMC) in n-hexane (0.1 wt %) was poured on the UF membrane surface containing TEA and allowed to stand for 2 min at 25° C. The excess TMC was drained off and the glass plate was placed inside a hot air oven at 90° C. for 10 min to complete the hydrolysis reaction of TMC to trimesic acid. The cured membrane was removed from the oven and allowed to cool back to 25° C. and the glass plate was transferred into a DI water bath at 25° C. The washing was repeated for one more time and the resultant TFC membrane was allowed to stand in a water bath until further characterization and testing.

Chemical characterization of the coating layer in the TFC membranes was difficult because of the micro sized thickness of the coated layer and interference of the characteristic peaks of the support UF polymer material with selective top layer peaks in the spectral data. Accordingly, a sheet of porous stainless steel sintered plate (thickness: 0.6 mm, size: A4 size) was coated with a self-assembled trimesic layer using 1.0 wt % TMC composition followed by oven heating at 90° C. for 10 minutes (using a similar protocol as described previously). The formed thin layer was collected from the stainless steel plate by gentle scratching and the solids were washed with deionized water (two times) and dried at 80° C. before performing a detailed chemical characterization.

FTIR analysis of the trimesic acid layer formed between triethylamine and trimesoyl chloride interface was conducted (FIG. 1). The spectral data obtained was compared with the FTIR spectrum of hydrogen bonded trimesic acid layer reported in the literature. The self-assembled trimesic acid layer between triethylamine and trimesoyl chloride displayed all the characteristic peaks of trimesic acid reported in the literature.

Table 2 shows the IR spectrum of the self-assembled trimesic acid layer, displaying characteristic peaks.

TABLE 2

IR spectrum of self-assembled trimesic acid layer

| Chemical functional groups | Wavenumber cm$^{-1}$ | Structure |
|---|---|---|
| Aryl C=O stretching | 1697.8 | |
| Aromatic C=C stretching | 1598.2 | |
| In plane —OH band | 1398.4 | |
| C—O stretching | 1284.9 | |
| Out of plane aromatic C—H band | 808.0 | |
| C—N stretching | 1099.1 | |
| Overtone and combination bands of aromatic group | 2495.9 and 2602.2 | |
| Aromatic and alkyl C—H stretching | 3000-3100 | |

The carbonyl (—C=O) stretching of aromatic acids generally appearing in the range of 1720 cm$^{-1}$ is shifted to the lower wavenumber value of 1697.8 cm$^{-1}$ in FIG. 2 due to the strong hydrogen bonding interactions between the carboxylic acid groups. Also, as observed in FIG. 2, the (—C=O) peak is not a sharp singlet, instead it is a broad shoulder type which is a typical characteristic of an amide type bonding interaction between the acid group of trimesic acid and triethylamine formed at the membrane interface. Thus, a broad shoulder peak at 1697.8 cm$^{-1}$ is due to merging of the two types of —C=O groups present in the self-assembled trimesic acid structure.

The proton NMR of self-assembled trimesic acid layer was analyzed using NMR instrument from Bruker (400 MHz) by dissolving the sample in DMSO-d$_6$ solvent. FIG. 3A clearly indicates the formation of hydrolyzed trimesic acid molecules with characteristic peak at δ=8.64 ppm representative of aromatic protons (FIG. 2A) of trimesic acid. Generally, the peaks corresponding to triethylamine appear in the range of 0.93 ppm and 2.43 ppm in DMSO-d$_6$. However, the spectrum of self-assembled trimesic acid produced peaks corresponding to triethylamine at δ=3.04-3.1 ppm (quadrat) corresponding to —CH$_2$ protons and peak at δ=1.1-1.2 ppm (triplet) corresponding to —CH$_3$ protons. The downfield shifting for —CH$_2$ and —CH$_3$ protons was observed due to the deshielding effect from positively charged nitrogen atom of triethylamine.

Figure 2A:
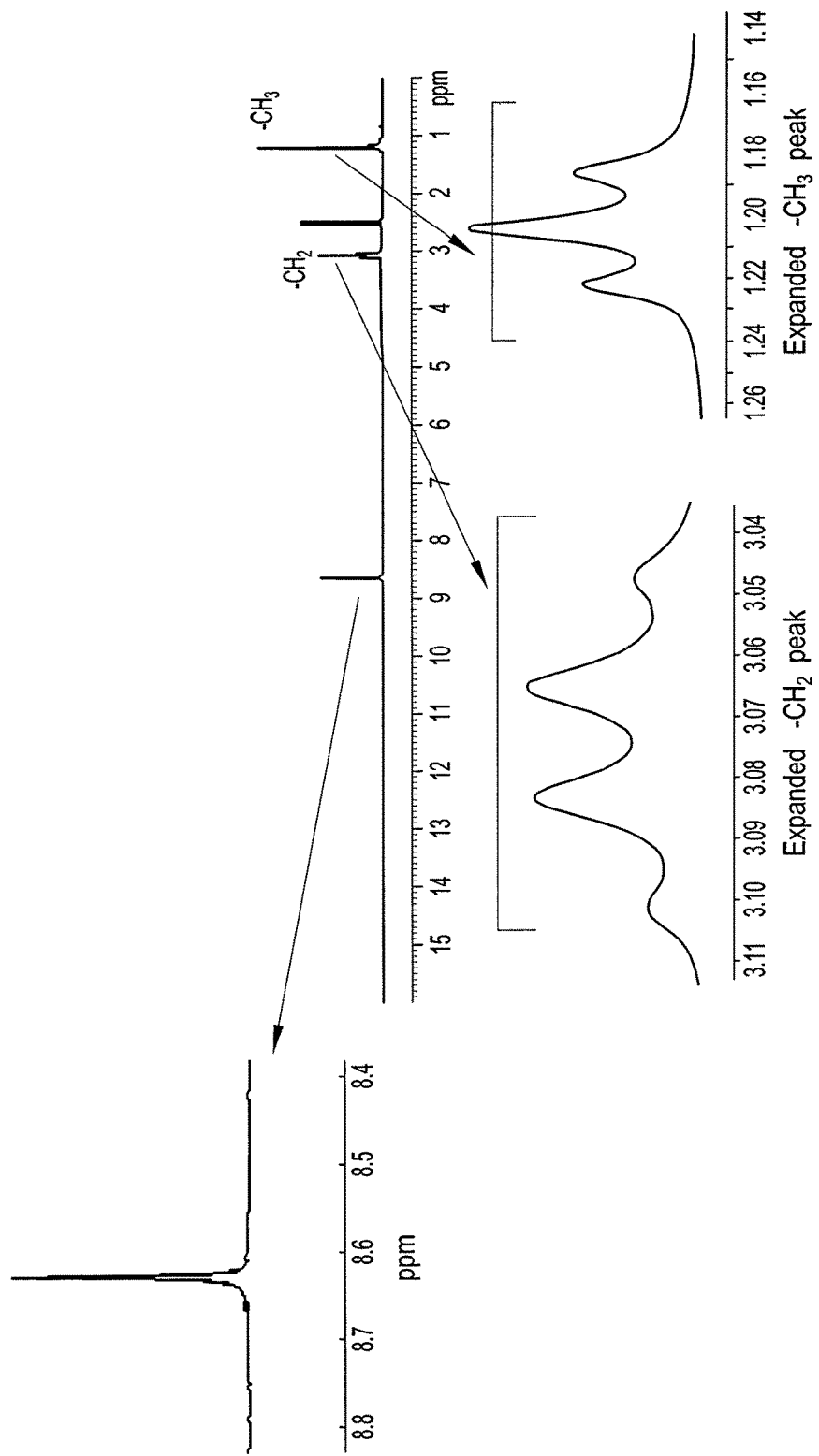
FIG. 2A shows $^1H$ Nuclear Magnetic Resonance (NMR) spectrum of the self-assembled trimesic acid layer.
Figure 2B:
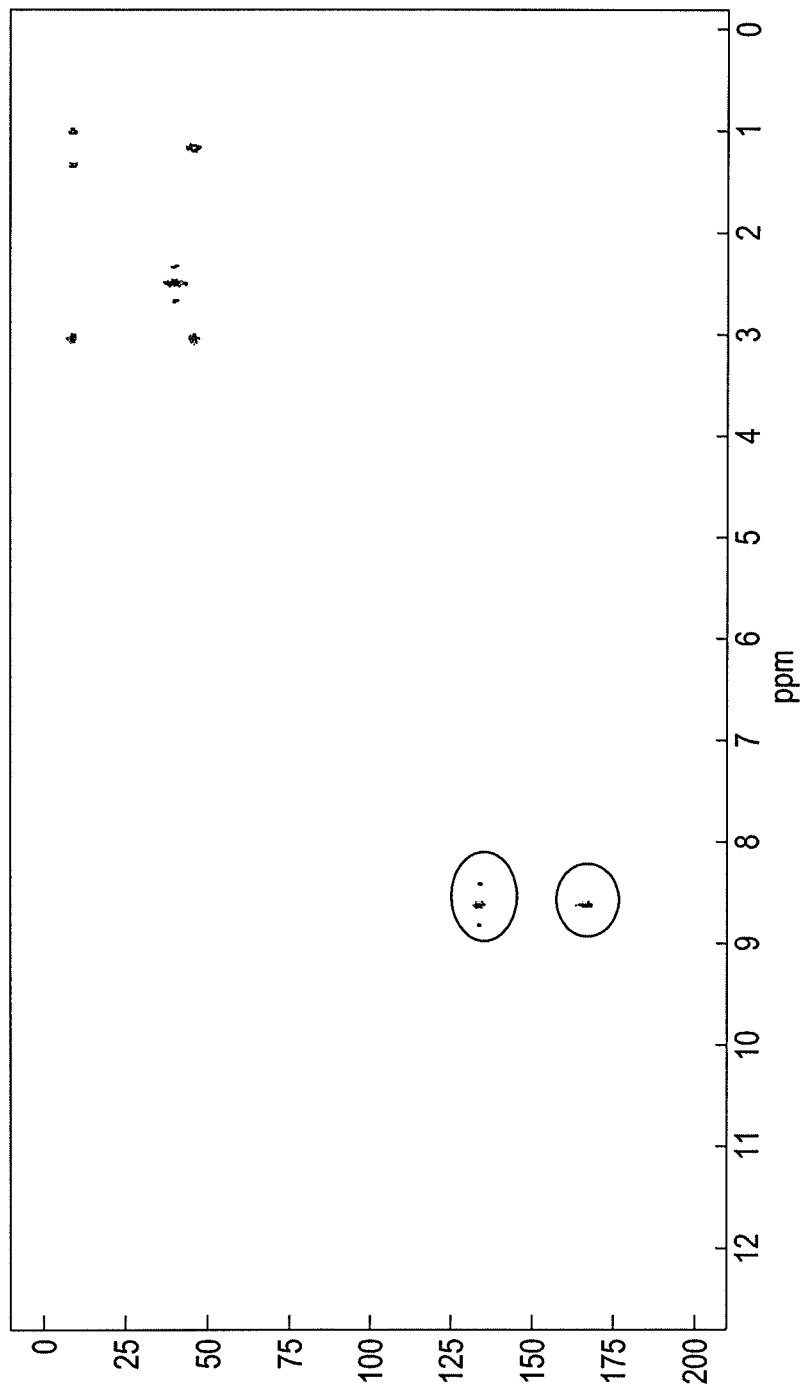
FIG. 2B shows $^1H$-$^{13}C$ Heteronuclear Multiple Bond Correlation (HMBC) spectrum of self-assembled trimesic acid layer.

The 1H NMR spectrum in FIG. 2A did not display any characteristic peaks corresponding to DMSO-water, which usually appear in the region of 3.3 ppm. The chemical shift value of DMSO-water will experience downfield shift in the presence of any hydrogen bond acceptors in the molecule. Therefore, there is a possibility of merging of hydrogen bonded trimesic acid protons within the aromatic proton peak at δ=8.64 ppm. To confirm this and also to confirm the hydrogen bonding interactions between carboxylic acid groups of trimesic acid a 2D Heteronuclear Multiple Bond Correlation (HMBC) and $^1$H-$^1$H Total Correlation Spectroscopy (TOCSY) experiments were performed. HMBC correlates chemical shifts of two types of nuclei separated from each other with two or more chemical bonds. More specifically, $^1$H,$^{13}$C-HMBC correlates chemical shifts of protons with carbons separated with two or three bonds. As highlighted in FIG. 2B, HMBC spectrum revealed the correlation between —C=O (appeared at 166.7 ppm, FIG. 2B) of trimesic acid with the —OH proton (merged with aromatic proton at 8.64 ppm) of neighboring trimesic acid. The spectrum also revealed the interactions between the —OH groups of neighboring trimesic acid groups.

Figure 2C:
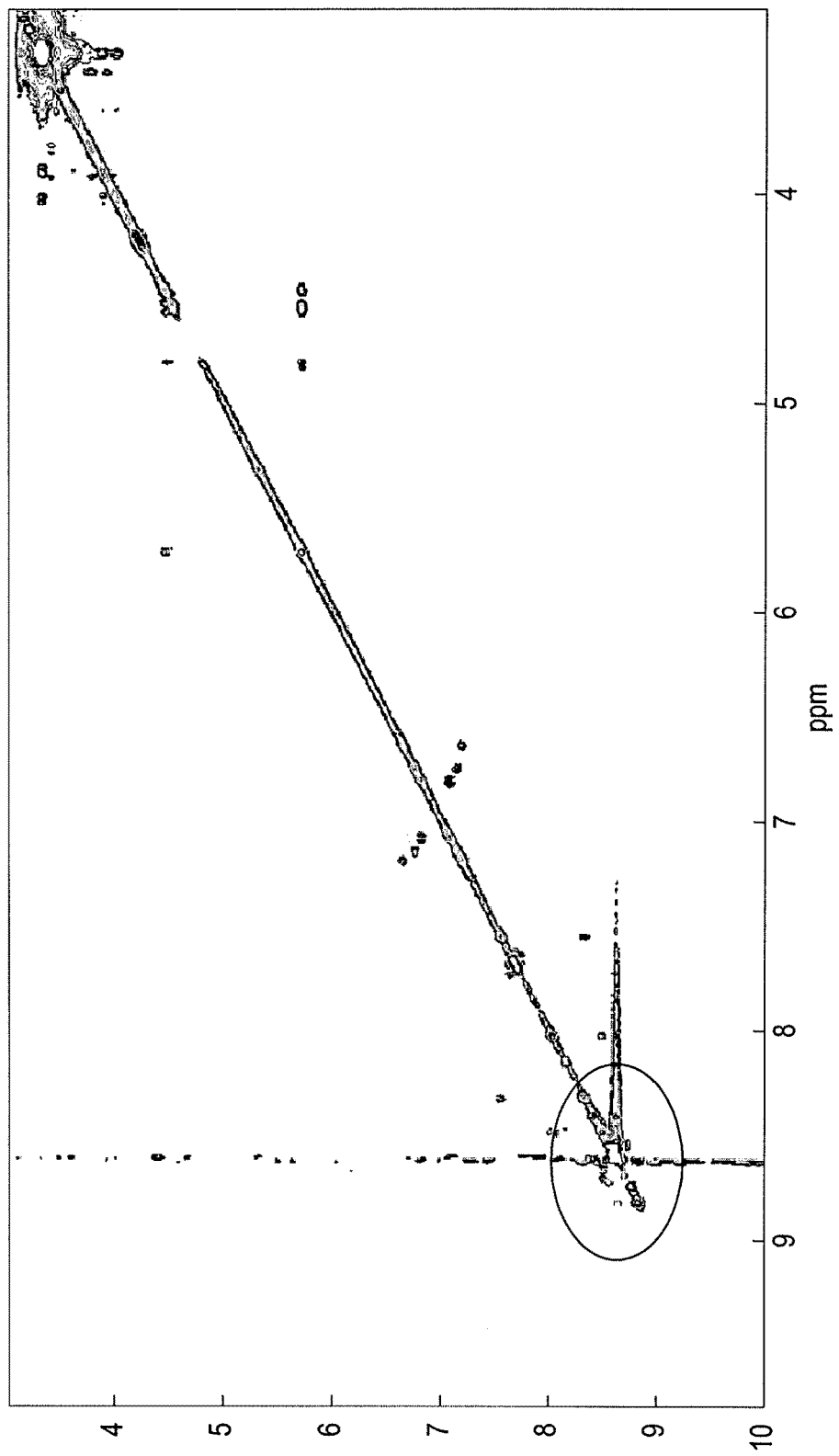
FIG. 2C shows 1H-1H TOCSY spectrum of self-assembled trimesic acid layer.

FIG. 2C shows $^1$H-$^1$H Total Correlation Spectroscopy (TOCSY) of the self-assembled trimesic acid layer. Generally, TOCSY will produce cross peaks of coupled protons not only for nuclei which are directly coupled, but also between nuclei which are connected by a chain of couplings. The TOCSY spectrum of trimesic acid layer is presented in FIG. 2C, and it showed strong $^1$H-$^1$H correlation corresponding to the —OH groups of trimesic acid which was merged with the aromatic protons.

Figure 2D:
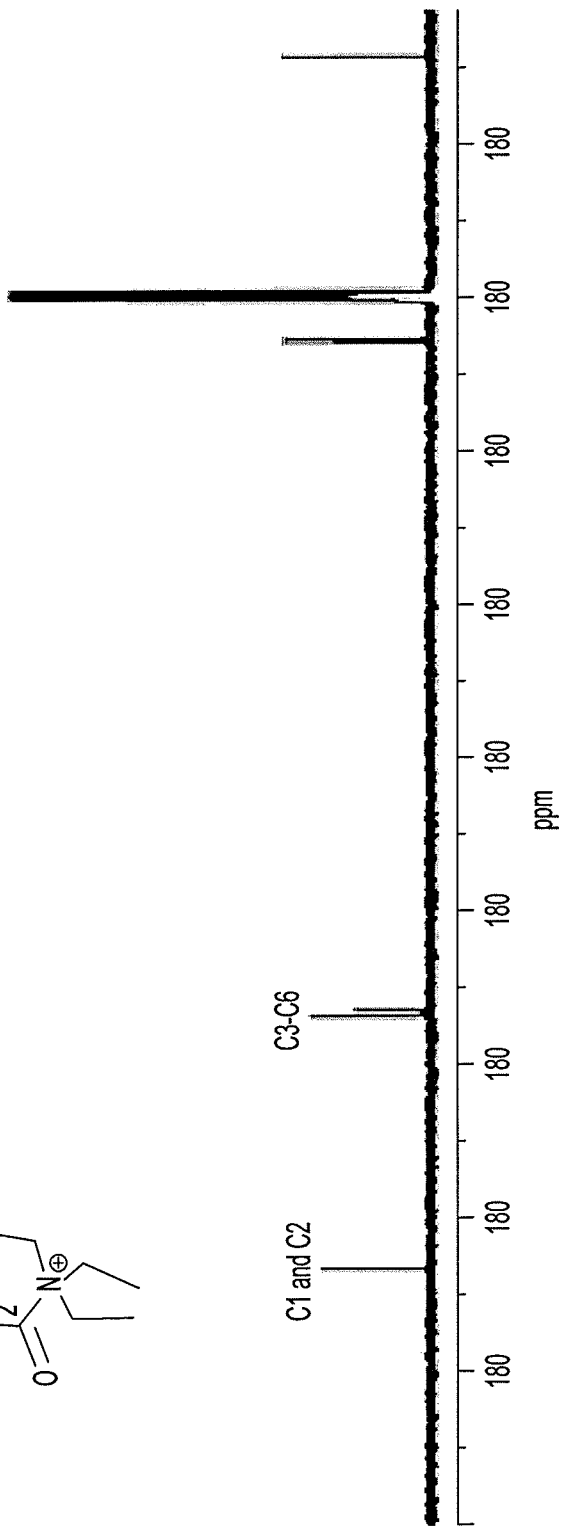
FIG. 2D shows 13C NMR spectrum of self-assembled trimesic acid layer.
Figure 2E:
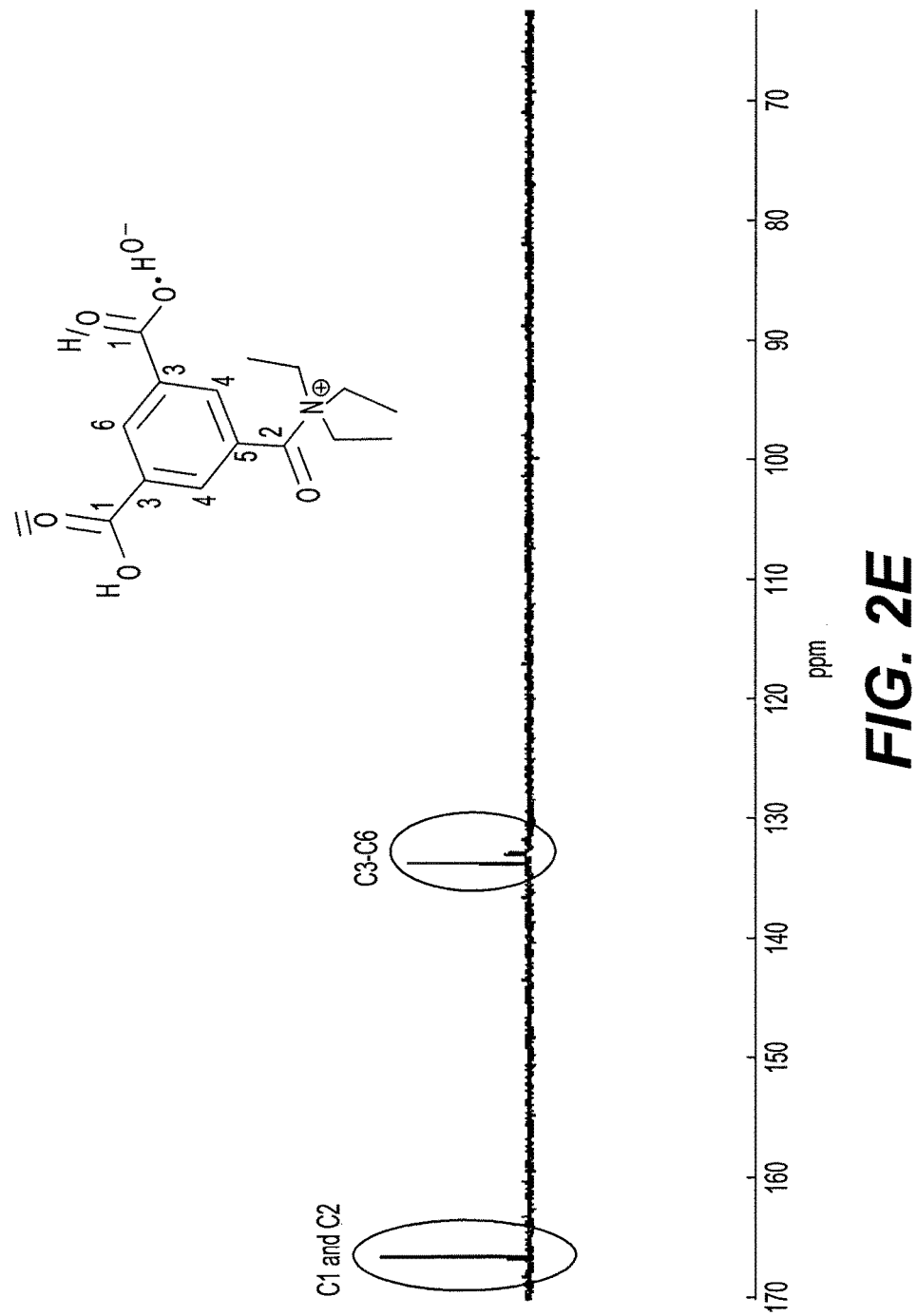
FIG. 2E shows the expansion of 13C NMR spectrum of self-assembled trimesic acid layer.

FIG. 2D represents the 13C NMR spectrum of the self-assembled trimesic acid layer and the peak corresponding to —C=O of acid group appeared at δ=166.7. However, the expanded 13C spectrum as presented in FIG. 2E indicated two distinct peaks for —C=O carbon. The expanded spectrum revealed the existence of two different chemical environment for —C=O groups at C1 and C2 as indicated in FIG. 2C.

The $^{13}$C spectrum presented in FIG. 2C displayed characteristic peaks for aromatic carbon at 133.8 and 132.9. However, the expanded $^{13}$C spectrum (FIG. 2E) was diverse and presented four distinct chemical environments of aromatic carbon atoms. The four distinct peaks represented the four different carbon atoms (C3-C6) present on the aromatic rings as presented in FIG. 2E. The $^{13}$C spectrum displayed peaks corresponding to triethylamine at δ=45.78 (—CH2 carbon) and δ=8.94 (—CH3 carbon) and again confirmed the involvement of carboxylate ions in quaternary salt formation with triethylamine.

Conventionally, the fabrication of TFC membranes comprising a top polyamide layer includes the coating of substrate layer with aqueous meta-phenylene diamine (MPD) solution. This leads to the penetration of MPD into the surface as well as into the pores of the substrate layer. In the subsequent step, treating the MPD coated membrane with trimesoyl chloride results in the formation of polyamide thin layer through interfacial polymerization reaction. The membrane fabrication protocol for the membrane of the present teachings, however, includes the treatment of substrate UF layer with triethylamine solution as the first step. This resulted in the penetration of triethylamine molecules into the surface and pores of the UF support. In the subsequent step, treatment of the substrate layer with trimesoyl chloride resulted in the hydrolysis of trimesoyl chloride to trimesic acid. Here, triethylamine played a dual role of hydrolysis of the trimesoyl chloride to self-assembled trimesic acid molecules, and further, penetration of trimesic acid molecules to the membrane surface through ionic interactions. The NMR spectral studies confirmed such interactions on the UF support by displaying the peaks corresponding to both trimesic acid and triethylamine.

Example 2

Nanomaterials for TFN Membrane Fabrication

The protocol used for the fabrication of the TFN membranes is similar to that of TFC membranes. However, the incorporation of nanomaterials onto the top surface of NF membranes was achieved using a variety of nanomaterials at different compositions in the range of 0.025 wt %-2.0 wt % by dispersing in the aqueous triethylamine solution (FIG. 3). The solution was exposed to ultra-sonication for 15 minutes using SONICS vibra cell at an amplitude of 30% and pulse of 25 for the uniform distribution of nanomaterials in TEA solution. Subsequently, a similar protocol as described earlier was employed for the coating of trimesic acid layer.

The loading of 0.05 wt % of nanomaterial was found to be an optimal loading composition to attain high performance. This composition corresponds to better dispersion in the TEA aqueous solution by overcoming the agglomeration effect and leading to high rejection and comparatively high flux.

The incorporation of nanomaterials into the active polyamide layer of NF membranes resulted in enhanced performance of the membranes when compared to control TFC membrane. The nanomaterials with sizes in the range of 10-70 nm and containing hydroxyl groups (metal oxides), carboxylic acid, sulphonic acid and amine functional groups are suitable to improve the performance compared to the control TFC membrane. The tendency of such nanomaterials to improve the NF membrane performance compared to control TFC membrane could be explained by: their high dispersion in aqueous triethylamine solution via polar-polar interactions; the improved hydrogen bonding interactions between the free carboxylic groups of the self-assembled trimesic acid and the polar groups of nanomaterials (FIG. 3), and the additional nano-channels created by the nanomaterials for the transport of solvent under separation.

Example 3 pH Dependent Flux Study

A pH dependent NF performance test was conducted to assess the stability of trimesic acid layer NF membranes at different pH conditions. The seawater sample as a feed solution for the tests was pre-filtered using UF membrane. The TFC membrane test coupons were cut in the shape and size of the membrane holder of the NF test unit. Then the samples were dipped in different pH solutions 3-12 pH (adjusted by using NaOH and HCl solutions) with slow agitation at room temperature at 25-26° C. The NF membrane performance was evaluated in terms of flux at a pressure of 150 psi after a duration of 24 h of immersion.

At higher pH levels (pH 10 to 12), trimesic acid self-assembled NF membranes produced a slight increase in the flux due to the increased affinity of carboxylate ions towards $Na^+$ ions which might affected the self-assembly via hydrogen bonding. Also, the lower pH values of the feed solution favored the membrane flux due to protonation of the trimesic acid groups involved in hydrogen bonding. However, the flux increase at two extreme pH values was much less (FIG. 7) and proved the stability of hydrogen bonded self-assembled trimesic acid layer over a wide range of pH 3-12.

Example 4 pH Dependent Zeta-Potential Analysis

Figure 8:
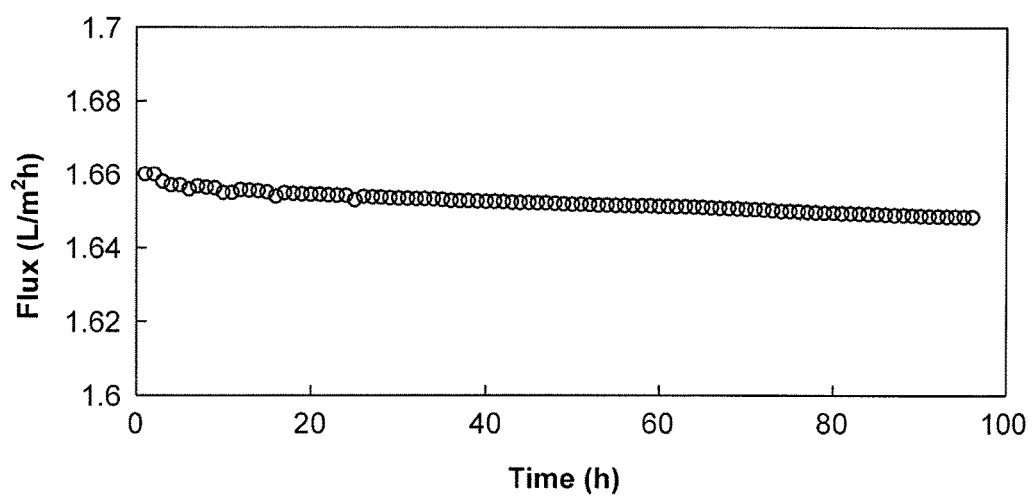
FIG. 8 is a graph showing flux of TFN-0.05$TiO_2$ membrane according to the present teachings.

Most of the commercial NF membranes are negatively charged and the charge exclusion principle governs the rejection in these membranes. The zeta potential of TFC membrane was evaluated using ZETA CAD instrument France (FIG. 8). In a typical procedure, the sample was measured in a NaCl solution ($10^{-2}$ M, pH 5.5) and quickly equilibrated within the sample cell by circulating the electrolyte. A special cell model ZC1200 for tangential measurement was used for flat material 75×25 mm. The cell consists of two rectangular pieces of sample which are placed face to face in order to create a thin gap where the electrolyte passes through. The bottom surface of the membrane was fixed on the cell piston with double glued tape. NaOH and HCl solutions were used to vary the pH of the electrolyte by keeping the ionic strength constant. The initial electrical conductivity was fixed at 0.25 mS/cm.

Figure 4:
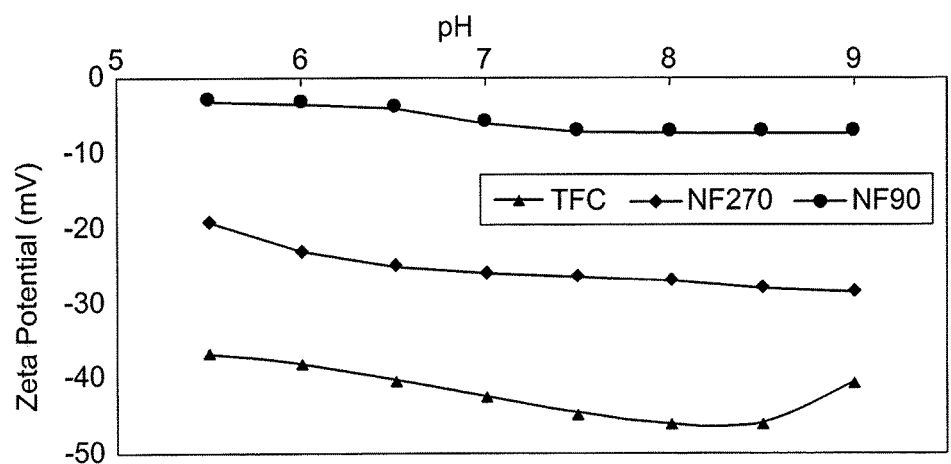
FIG. 4 is a graph showing pH dependent zeta potential values of TFC membrane compared with the commercial NF270 and NF90.

The results presented in FIG. 4 reveal the high negative charge on the surface of innovative TFC NF membrane compared to the commercial NF270 and NF90 NF membranes. The highly negative streaming potential values attributed to the carboxylic acid functionalities of trimesic acid groups on the surface.

The zeta potential study was further extended beyond the actual experimental time of zeta potential measurements to determine the stability of NF membrane surface. The streaming potential measurements were continued over a period of 24 h at different pH values. The study was performed to determine the loss or washing of carboxylic acid (—COOH) functionalities from the membrane surface at different pH values, which will be recorded as fall in zeta potential values. The data obtained are presented in Table 3, and the results revealed the stability of the self-assembled trimesic acid layer over a pH range of pH 3 to pH 12. The more negative values of zeta potential indicated the higher assembly of trimesic acid groups on the membrane surface. A slight drop-in the zeta potential values after 24 h confirmed the stability of the trimesic acid layer over pH of 3-12. It is notable that a negligible fall in zeta potential values observed in the range of 5-9 pH corresponding to the operating pH ranges for most of the NF applications.

TABLE 3 pH dependent zeta potential values of the TFC membrane at different intervals of time
Zeta potential (mV) of TFC NF membrane

| pH | Initial reading | After 24 h |
|----|-----------------|------------|
| 3  | −33.7           | −32.8      |
| 4  | −34.7           | −33.9      |
| 5  | −34.8           | −34.4      |
| 6  | −37.9           | −37.6      |
| 7  | −42.4           | −42.3      |
| 8  | −45.8           | −45.5      |
| 9  | −40.5           | −39.7      |
| 10 | −38.1           | −37.5      |
| 11 | −35.0           | −34.1      |
| 12 | −33.2           | −32.4      |

Example 5

Membrane Characterization

Membrane characterization was performed for the newly invented membranes using various instrumentation techniques. The NF membrane fabricated by the incorporation of 0.05 wt % of $TiO_2$ nanoparticles, i.e., "TFN-0.05$TiO_2$ NF membranes," was considered as a typical example for TFN-NF membrane.

The surface and cross-sectional morphology of TFN-0.05$TiO_2$ NF membrane and commercial UF membrane was compared and analyzed using Keysight 8500 Field Emission Scanning Electron Microscope (FESEM) (FIGS. 5A-5F). The imaging was conducted at Back Scattering Electrons (BSE) mode to overcome the membrane charging effect.

Figure 5A:
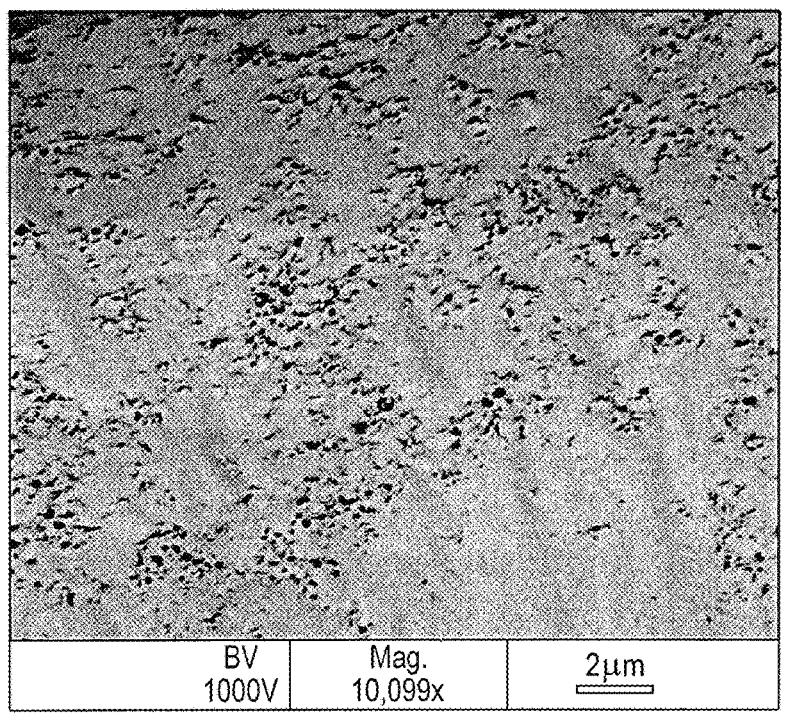
FIG. 5A shows an FESEM image of surface of UF support and TFN-0.05$TiO_2$ membrane.
Figure 5B:
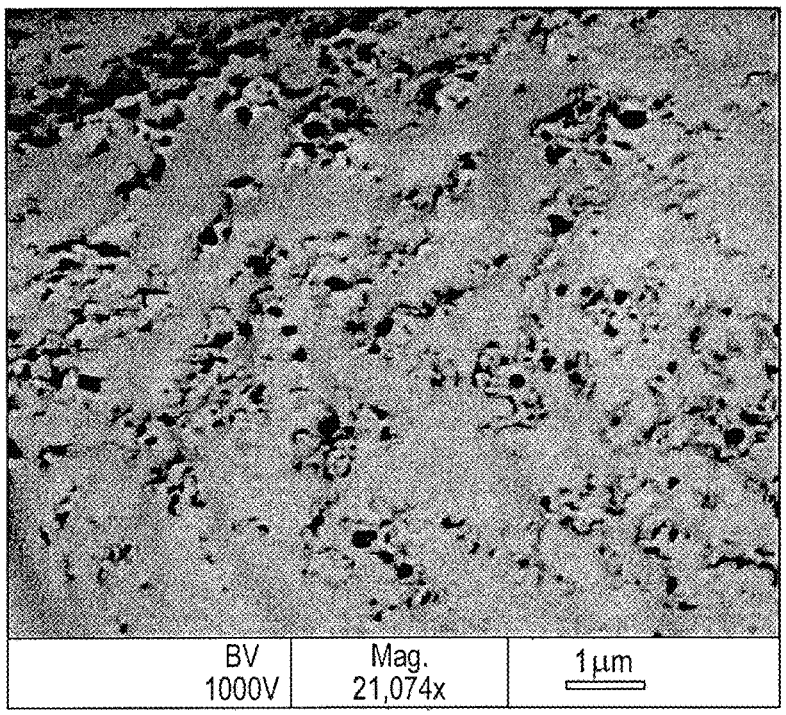
FIG. 5B shows an FESEM image of surface of UF support and TFN-0.05$TiO_2$ membrane.
Figure 5C:
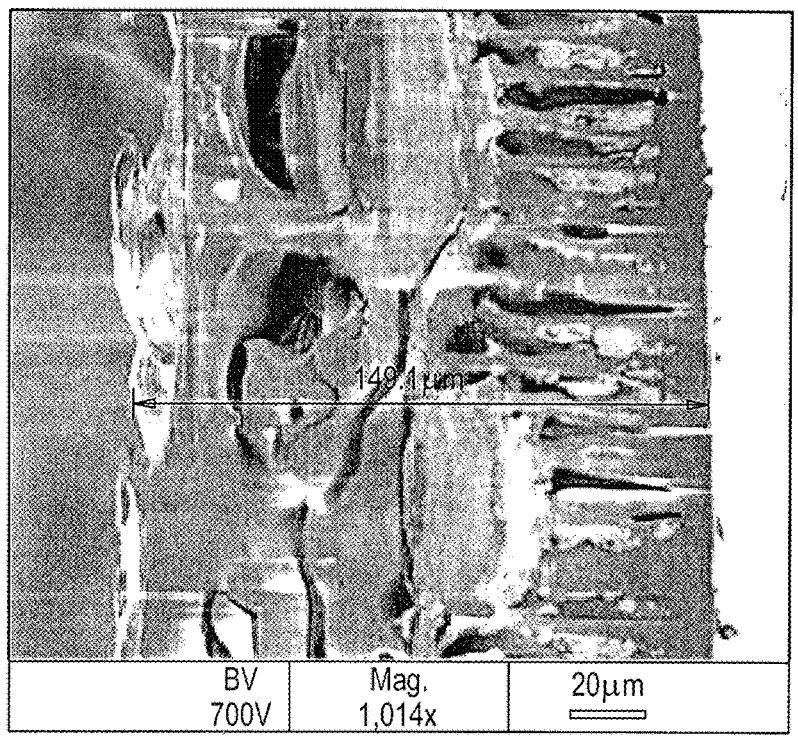
FIG. 5C shows an FESEM image of a cross-section of the UF support.
Figure 5D:
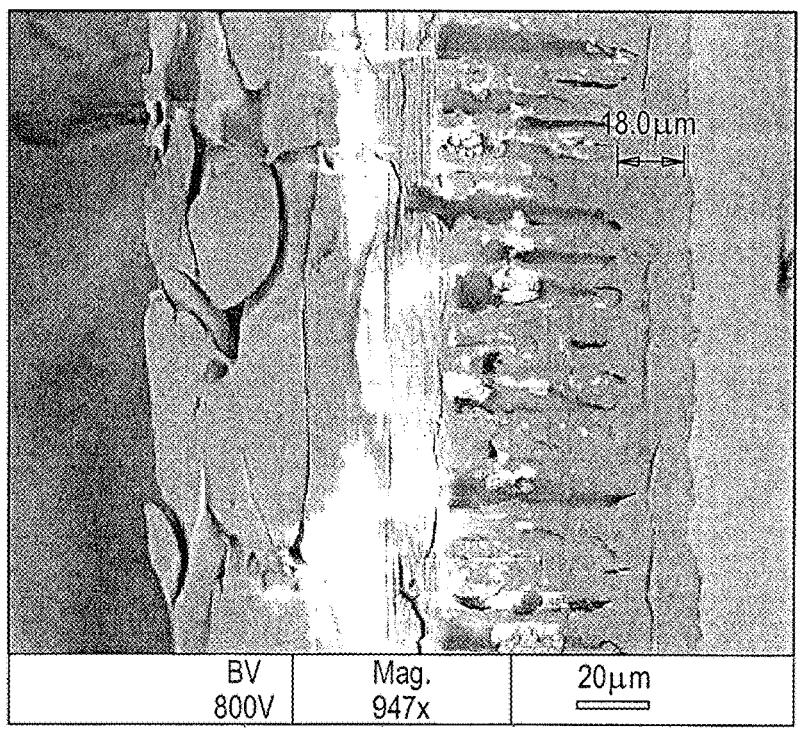
FIG. 5D shows an FESEM image of a cross-section of the UF support.
Figure 5E:
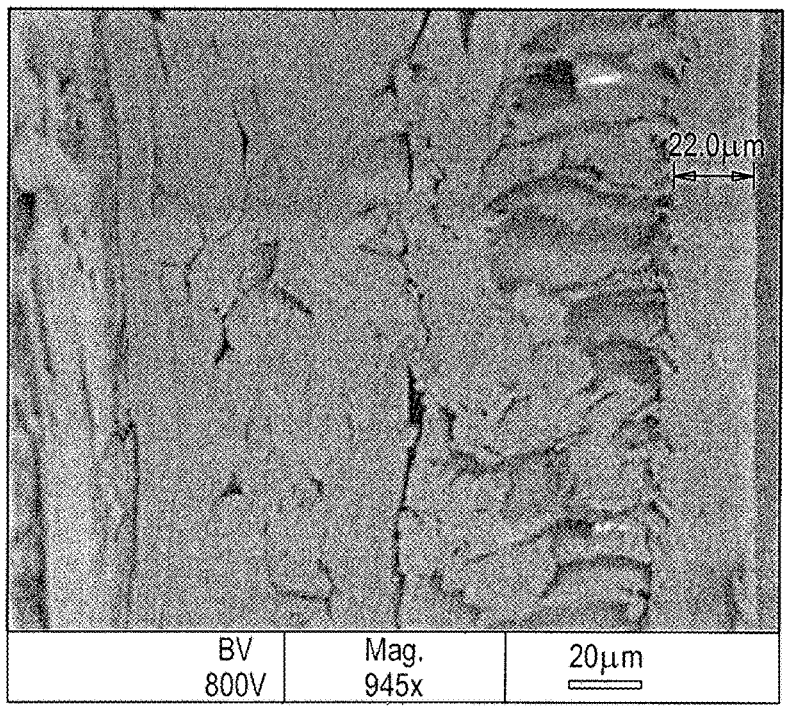
FIG. 5E shows an FESEM image of a cross-section of the TFN-0.05$TiO_2$ membrane according to the present teachings.
Figure 5F:
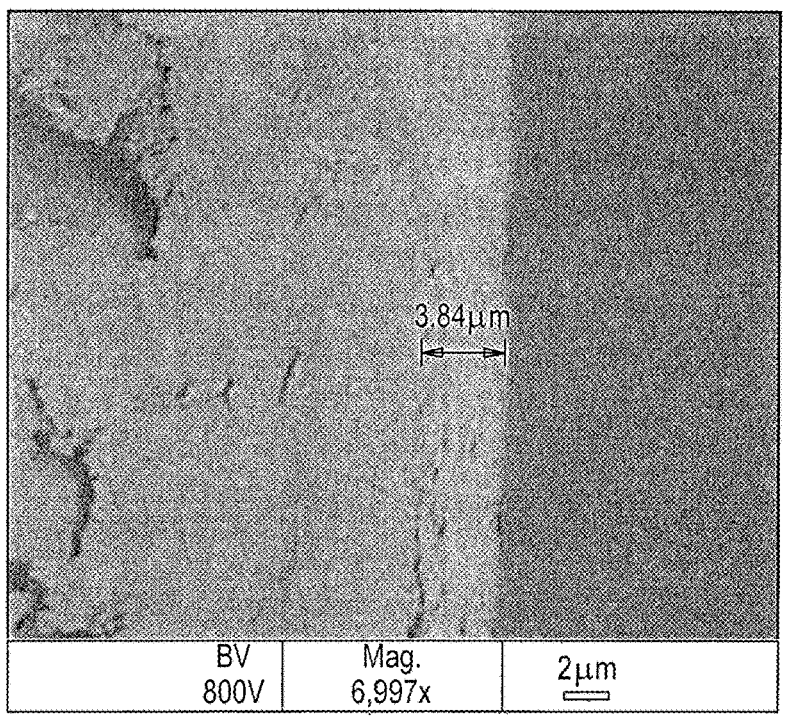
FIG. 5F shows a magnified cross-section of the TFN-0.05$TiO_2$ membrane according to the present teachings.

Pore structures in the surface of the UF support and TFN-0.05$TiO_2$ membrane can be seen in FIGS. 5A and 5B. An FESEM image of a cross-section of UF support indicated membrane total thickness of to be approximately 150 µm (FIG. 5C). An FESEM image of a cross-section of UF support indicated a thickness of the dense top layer to be approximately 18 µm (FIG. 5D). An FESEM image of a cross section of the TFN-0.05$TiO_2$ indicated an increased thickness of the dense top layer at approximately 22 µm by coating with the TMC layer (FIG. 5E). An FESEM image of a magnified cross-section of TFN-0.05$TiO_2$ indicated a coating layer thickness of approximately 3.5 µm to approximately 4 µm (FIG. 5F).

Example 7

Contact Angle Analysis

The contact angle of TFC-NF and TFN-0.05$TiO_2$ membranes was determined by sessile drop method using contact angle goniometer instrument was from KINO instruments USA. In this method, a drop of water was allowed to drop on the surface of membrane and after 30 seconds, the angle between the solid sample's surface and the tangent of the droplet's ovate shape at the edge of the droplet was measured using the instrument. The average value obtained after three measurements over different areas of membrane was presented in the report.

Figure 6:
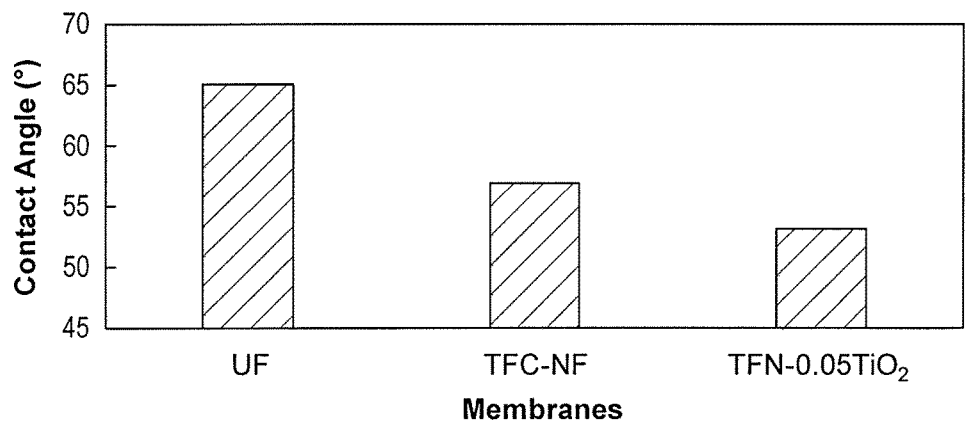
FIG. 6 is a graph showing contact angle values of the membranes according to the present teachings.

Generally, lesser the contact angle (CA) higher will be the hydrophilicity of the membrane surface. As shown in FIG. 6, the contact angle study clearly indicated the increased surface hydrophilicity of the TFC-NF membrane (CA 56.94°) compared to UF membrane (CA 65.23°). The incorporation of 0.05 wt % of $TiO_2$ resulted in further decrease in CA value to 53.1° for TFN-0.05$TiO_2$ membrane.

Example 7

AFM Analysis

The UF, TFC-NF and TFN-$TiO_2$ NF membrane surface was characterized in terms of mean roughness using atomic force microscope (AFM) instrument from Concept Scientific Instrument (Nano-Observer model), France. A membrane area of 10 µm×10 µm was scanned to obtain mean roughness parameters of support UF membrane, TFC-NF and TFN-0.05$TiO_2$ membranes. The analysis confirmed that the coating of self-assembled TMC layer first reduced the average surface roughness of TFC-NF membrane to 450 nm from the initial roughness of 490 nm (UF membrane). Thereafter, the loading of 0.05 wt % $TiO_2$ increased the average surface roughness to 890 nm for the TFN-0.05$TiO_2$ membrane. The increased roughness due to the loading of $TiO_2$ nanoparticles is commonly observed because of accumulation of nanoparticles on its surface.

Example 8

Molecular Weight Cut-Off Study

Figure 7:
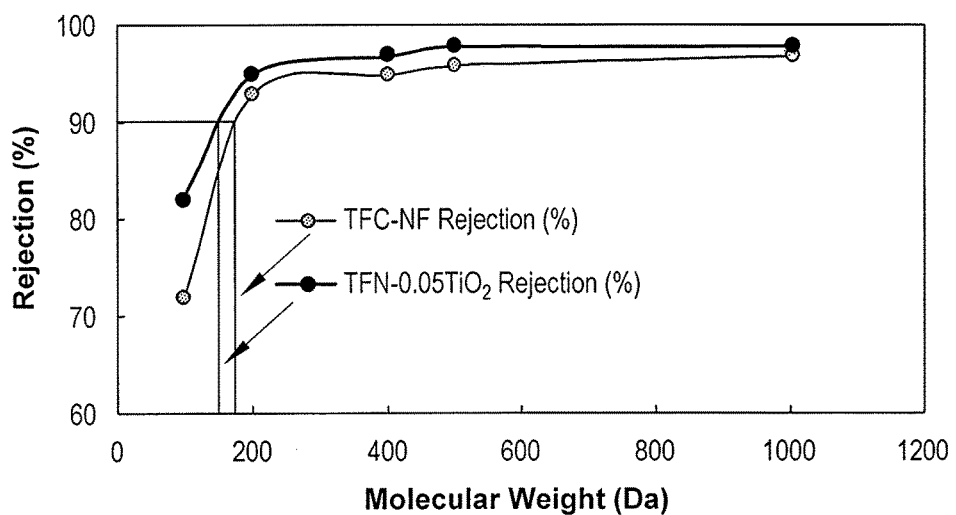
FIG. 7 is a graph showing the molecular weight cut off of the membranes according to the present teachings.

The molecular weight cut off (MWCO) study of TFC-NF and TFN-0.05$TiO_2$ membranes was performed using aqueous solutions of polyethylene glycol (PEG) of molecular weights Mw=100, 200, 400, 500 and 1000 Da. For each experiment, the PEG feed solution concentration was maintained at 1 g/L and the pressure applied during rejection tests was 150 psi at 25° C. The concentrations of PEG permeate samples were measures by Gel Permeation Chromatography (GPC, Agilent Technologies) with an RI detector. The MWCO of the membranes was estimated based on % rejection vs. molecular weight (FIG. 7). As shown in FIG. 7, the MWCO of TFC-NF and TFN-0.05$TiO_2$ membranes were ~150 Da and 170 Da, respectively. Furthermore, the rejection of PEG 600 confirms that the MWCO is about 600 Da. The MWCO of the both novel membranes were less than commercial NF-90 (MWCO=200-300 Da) and NF270 (Mw=300-400 Da) collected from the manufacturer's specifications.

Example 9

Seawater Pretreatment Performance Tests

The pretreatment performance test for the newly fabricated NF membranes was performed using lab scale SEPA cross/tangential flow cell from Sterlitech Corporation USA. SEPA cell provides fast and accurate performance data for polymeric flat sheet membrane with minimal amounts of membrane, product, expense or time. It has effective membrane area of 140 $cm^2$ with a maximum operating pressure of 1000 psi (69 bar).

The initial performances of the TFC and TFN-$TiO_2$ membranes were tested in terms of rejection using 1000 ppm aqueous solutions of NaCl and 2000 ppm solution of $MgSO_4$ respectively. The test conditions included temperature of 25° C.-26° C. and a pressure of 150 psi. The salt concentration in permeate solution was determined by measuring the electrical conductivity of the salt solution and by comparing with the calibration plot drawn between salt concentration and conductivity. Salt separation was then computed using the following expression.

$$\% R = (1 - C_p/C_f) \times 100$$

Where, R is the salt rejection and Cp and Cf are the concentrations of the permeate and feed solutions, respectively.

The rejection by the TFC and TFN NF membranes were 63% and 69%, respectively, towards the NaCl solution, and 97.6% and 98.4% towards the $MgSO_4$ solution, respectively.

Example 10

Seawater NF Performance Tests

The feed water sample was collected from the Doha east power station and passed through UF membrane to remove any suspended solids. Specifications of UF membrane for treatment of Doha seawater before NF pretreatment are provided in Table 4. The seawater chemistry of filtered seawater for the NF tests is presented in Table 5. It should be understood that the pretreatment trials for TFN-0.05TiO$_2$, TFC-NF, NF90, and NF270 were performed at the Doha Research Plant laboratory and feedwater sample was collected from Doha East power station, Kuwait with TDS of 43.69 g/L.

TABLE 4

Specifications of UF membrane before NF pretreatment

| | |
|---|---|
| pH range (25° C.) | 1-11 |
| Flux (GFD)/psi | 85/30 |
| MWCO (Daltons) | 10,000 |
| Polymer | Polyethersulfone |
| Vendor | GE Osmonics |

TABLE 5

Seawater chemistry of the sample collected from Doha east power station

| | |
|---|---|
| Seawater pH | 8.13 |
| TDS | 43.697 g/L |
| Na$^+$ | 15.037 g/L |
| mg$^{2+}$ | 1.55 g/L |
| Ca$^{2+}$ | 0.5449 g/L |
| SO$_4^{2-}$ | 4.352 g/L |
| Cl$^-$ | 26.084 g/L |
| K$^+$ | 0.458 g/L |
| B$^{3+}$ | 3.8 g/L |

Table 6 provides salt rejection/flux data for TFC-NF, TFN-0.05TiO$_2$ and the commercial NF membranes during the seawater pretreatment. The NF pretreatment trials for TFN-0.05TiO$_2$, TFC-NF, NF90, and NF270 were performed at Doha Research Plant laboratory and feedwater sample was collected from Doha East power station, Kuwait with TDS of 43.69 g/L.

TABLE 6

Salt rejection/flux

| Membrane (Vendor) | Seawater TDS (g/L) | pH | Permeability (L/m$^2$/h/bar) | Rejection (%) | | | | | | |
|---|---|---|---|---|---|---|---|---|---|---|
| | | | | Na$^+$ | Mg$^{2+}$ | K$^+$ | Ca$^{2+}$ | Cl$^-$ | SO$_4^{2-}$ | B$^{3+}$ |
| TFN-0.05TiO$_2$ | 43.69 | 8.1 | 0.16 | 52.6 | 53.4 | 44.4 | 58.4 | 48.8 | 88.5 | 50.4 |
| TFC-NF | 43.69 | 8.1 | 0.14 | 36.5 | 52.4 | 41.3 | 56.7 | 44.9 | 80.2 | 40.0 |
| NF90 (Dow Filmtec) | 43.69 | 8.1 | 0.18 | 29.26 | 16.69 | 37.25 | 57.16 | 15.1 | 56.86 | 17.2 |
| NF270 (Dow Filmtec) | 43.69 | 8.1 | 0.56 | 8.99 | 16.9 | 16.8 | 30.8 | 5.92 | 51.7 | 13.9 |
| NF200 (Dow Filmtec) | 41.3 | 8.09 | 3.8 | 30.1 | 84.5 | 22.0 | 60.2 | 20.1 | 98.1 | NA |
| K-SR2 (Koch membrane) | 41.3 | 8.09 | 7.2 | 4.2 | 70.0 | 5.4 | 56.2 | 5.2 | 98.0 | NA |
| NF99-HF (Alfa Laval) | 41.3 | 8.09 | 5.4 | 11.1 | 81.2 | 19.6 | 62.0 | 22.1 | 97.2 | NA |
| ESNA 1-LF2 (Hydranautics) | 41.3 | 8.09 | 11.2 | 10.2 | 22.2 | 9.8 | 18.2 | 8.1 | 60.2 | NA |
| NF270-4040 (Dow Filmtec) | 31.1 | NA | NA | 10.1 | 65 | 6.2 | 38.2 | 13.2 | 99.0 | NA |

Flux of TFN-0.05TiO$_2$ membrane was measured over 96 hours for seawater feed solution form Doha east power station (applied pressure: 150 psi, temperature: 24° C.). The results are shown in FIG. 8. As shown in FIG. 8, the flux was stable, ranging from about 1.66 L/m$^2$h to about 1.64 L/m$^2$h for the TFN membrane over a running period of four days.

It is to be understood that the thin film nanocomposite nanofiltration membrane is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A thin film nanocomposite nanofiltration (TFC-NF) membrane comprising:
    a porous ultrafiltration support membrane; and
    a self-assembled coating layer including trimesic acid stabilized by hydrogen bonding on the support membrane, wherein the trimesic acid is formed by trimesoylchloride (TMC) undergoing complete hydrolysis in the presence of trimethylamine (TME), further wherein the total thickness of the TFC-NF membrane is about 150 um, additionally wherein the coating layer includes one or more nanomaterials having a size ranging from about 10 nm to about 70 nm, and wherein the nanomaterials are selected from the group consisting of titanium dioxide and functionalized titanium dioxide.

2. The thin film nanocomposite nanofiltration (TFC-NF) membrane as recited in claim 1, wherein the ultrafiltration membrane support comprises polyethersulfone.

3. A method for removing boron from seawater, comprising using the thin film nanocomposite nanofiltration membrane as recited in claim 1.

4. A method of preparing a thin film nanocomposite nanofiltration membrane, comprising:
    submerging a porous ultrafiltration support membrane in deionized water;
    removing the porous ultrafiltration support membrane from the deionized water;
    pouring an aqueous solution of a water soluble tertiary amine onto a surface of the support membrane to provide a first surface coating; and
    forming trimesic acid on the first surface coating by adding a solution of trimesoyl chloride to the first surface coating.

5. The method of preparing a thin film nanocomposite nanofiltration membrane as recited in claim 4, wherein the aqueous solution of a water soluble tertiary amine comprises triethylamine.

6. The method of preparing a thin film nanocomposite nanofiltration membrane as recited in claim 5, wherein the aqueous solution of triethylamine comprises about 0.25 wt % to about 1.5 wt % triethylamine.

7. The method of preparing a thin film nanocomposite nanofiltration membrane as recited in claim 6, wherein the aqueous solution of triethylamine comprises about 1.0 wt % triethylamine.

8. The method of preparing a thin film nanocomposite nanofiltration membrane as recited in claim 5, wherein the solution of trimesoyl chloride comprises about 0.1 wt % trimesoyl chloride in n-hexane.

9. The method of preparing a thin film nanocomposite nanofiltration membrane as recited in claim 5, further comprising allowing the solution of triethylamine to diffuse into the support prior to adding the solution of trimesoyl chloride.

10. The method of preparing a thin film nanocomposite nanofiltration membrane as recited in claim 4, wherein forming trimesic acid on the first surface coating further comprises heating the membrane support after adding the solution of trimesoyl chloride.

11. The method of preparing a thin film nanocomposite nanofiltration membrane as recited in claim 10, wherein heating the membrane support comprises disposing the membrane support in a hot air oven at a temperature of about 90° C. for about 10 minutes.

12. The method of preparing a thin film nanocomposite nanofiltration membrane as recited in claim 1, wherein the functional group of functionalized titanium dioxide is selected from the group consisting of hydroxyl, carboxylic acid, sulphonic acid and amine.

13. The thin film nanocomposite nanofiltration membrane of claim 1 wherein the functional group of functionalized titanium dioxide is selected from the group consisting of hydroxyl, carboxylic acid, sulphonic acid and amine.

* * * * *